United States Patent [19]
Dotter

[11] 3,762,521
[45] Oct. 2, 1973

[54] DRIVEN DISC FOR A FRICTION CLUTCH

[75] Inventor: Karl-Heinz Dotter, Schweinfurt am Main, Germany

[73] Assignee: Fichtel & Sachs AG, Schweinfurt am Main, Germany

[22] Filed: June 8, 1971

[21] Appl. No.: 151,007

[30] Foreign Application Priority Data
June 15, 1970 Germany.................. P 20 29 356.5

[52] U.S. Cl. ............... 192/106.2, 64/27 F, 64/27 C
[51] Int. Cl............................................ F16d 43/24
[58] Field of Search...................... 192/106.1, 106.2, 192/55, 70.18; 64/27 F, 27 C, 14, 15 C

[56] References Cited
UNITED STATES PATENTS
| | | | |
|---|---|---|---|
| 2,364,988 | 12/1944 | McFarland | 64/27 F |
| 3,380,566 | 4/1968 | Cook | 192/106.2 |
| 3,060,705 | 10/1962 | Stenger | 192/106.1 |
| 2,397,642 | 4/1946 | Blazek et al | 192/106.1 |

*Primary Examiner*—Charles J. Myhre
*Assistant Examiner*—Randall Heald
*Attorney*—Kelman & Berman

[57] ABSTRACT

The carrier of the friction facings in a driven disc for an automotive clutch is rotatably mounted on a flanged hub, and axially aligned sets of four recesses in the carrier and the flange receive four helical compression springs. Each spring resiliently resists relative angular movement of carrier and hub from a rest position by engaging respective, oppositely directed abutment faces in the two associated recesses, when the clutch transmits torque from the engine to the wheels of an associated vehicle. During engine braking, when torque is transmitted from the wheels to the engine, only two springs resist angular displacement of carrier and hub, the flange recesses being dimensioned not to present an abutment face to the two other springs.

10 Claims, 4 Drawing Figures

PATENTED OCT 2 1973 3,762,521

INVENTOR
Karl-Heinz Dotter
BY
Kelman and Berman,
AGENTS

DRIVEN DISC FOR A FRICTION CLUTCH

This invention relates to friction clutches, more specifically to clutches suitable for use in automotive vehicles, and particularly to a driven disc for such a clutch which is equipped with a torsion spring arrangement for damping vibrations in the power train of the vehicle.

It is known to mount the carrier for the friction facings of a driven clutch disc for rotation on a hub splined to the clutch shaft, and to transmit torque between the carrier and the hub by means of helical compression springs whose axes are approximately tangential relative to a circle about the common axis of rotation of the hub and carrier, hereinafter referred to as the clutch axis. The springs bias the hub and carrier toward an angular rest position and resiliently resist angular displacement of the carrier and hub relative to each other away from the rest position.

In a known type of a friction clutch equipped with vibration damping springs, the hub carries a flange, and each spring is received simultaneously in axially aligned openings of the flange and of the carrier. During angular displacement of the hub and carrier, the two end portions of the spring engage respective, opposite abutment faces in the two receiving openings and thereby resists angular displacement of the hub and carrier with a force which increases approximately linearly with increasing displacement. The springs are backed by abutments which limit the angular displacement, and it has been proposed to arrange these abutments in such a manner as to permit greater displacement in one direction than in the other direction before the engaged abutments make the springs ineffective. As long as the abutments do not operate to relieve the springs, the latter resist displacement in both directions in the same manner.

While the known driven clutch discs are effective in reducing vibrations in the power train and the noise resulting therefrom to some extent, they are not capable of suppressing noise due to vibration of the power train at its natural frequency, particularly when the driven clutch disc is the only resilient element of the power train.

It has now been found that the natural frequency of a power train can be shifted to a range outside the conditions of normal vehicle operations if the resilient resistance of the springs to angular displacement of the hub flange and the friction facing carrier is reduced in one direction of angular displacement from the rest position to less than the resistance of the springs in the other direction, so that the characteristic of the spring arrangement as a whole is steeper in the other direction than in the first-mentioned direction, the greater spring resistance being applied when torque is transmitted from the carrier to the flange. During normal vehicle operation, noise due to vibration of the power train at its natural frequency is thereby prevented.

The desired different response of the spring arrangement to torque applied in opposite directions is achieved most conveniently according to this invention by inactivating some of the springs, and at least one of them, during the angular displacement in which smaller spring resistance is desired.

Other features, additional objects, and many of the attendant advantages of this invention will readily become apparent as the invention becomes better understood by reference to the following detailed description of a preferred embodiment when considered in connection with the appended drawing in which.

Figure 1:
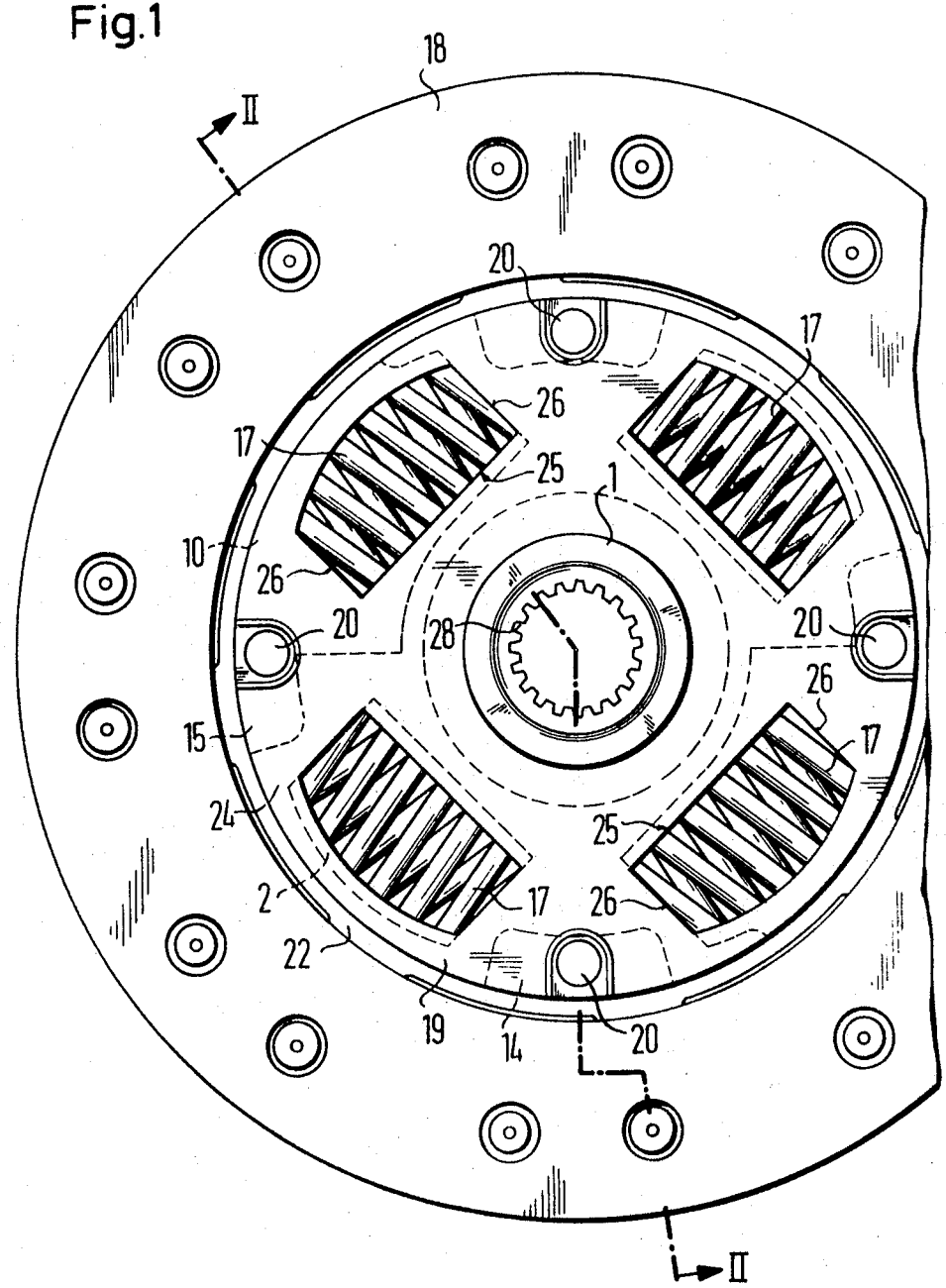
FIG. 1 shows a driven friction disc of the invention in fragmentary axial end view.

Referring initially to FIG. 1, there is seen a driven clutch disc whose exposed elements include a central hub 1 and a sheet metal disc 22. Peripheral portions of the disc 22 carry a rivetted annular friction facing 18. Rivets 20 attach the disc 22 to the outer periphery of a plate 19 coaxially rotatable on the hub 1. For identical openings 25 in the plate 19 are elongated tangentially relative to a circle about the clutch axis. The narrow faces of the plate 19 which bound the openings 25 in a direction toward the clutch axis are straight and offset 90° from each other. The two ends of a helical compression spring 17 received in each opening 25 engage respective abutment faces 26 of the plate which bound the opening 25 in the direction of the helix axis, that is, substantially tangentially relative to the clutch axis, and are perpendicular to the straight face. The face of the plate 19 which bounds the opening 25 in a radially outward direction is circularly and concavely arcuate, its radius of curvature being smaller than the distance between the concave face and the clutch axis.

The bore 28 of the hub 1 is axially grooved for torque-transmitting engagement with a splined clutch shaft (not shown). In the view of FIG. 1, the plate 19 obscures a flange 24 integral with the hub 1 whose features will be described in more detail with reference to FIG. 3.

Figure 2:
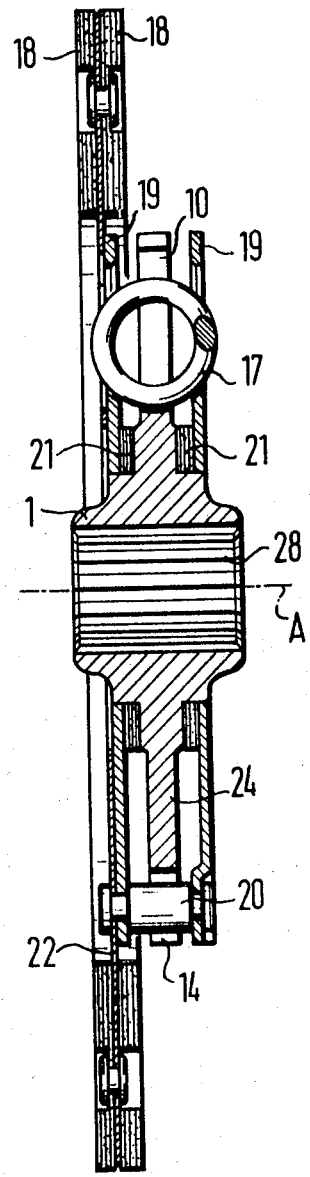
FIG. 2 illustrates the disc of FIG. 1 in section on the line II—II.

As is better seen by joint consideration of FIGS. 1 and 2, the four rivets 20 pass freely through respective notches 14, 15 in the circumference of the flange 24 and fasten the plate 19 seen in FIG. 1 to an identical plate 19 on the axially opposite side of the flange 24. The axes of the four helical springs 17 are located in recesses 2, 10 of the flange 24, and the springs extend into openings 25 of both plates 19. The rivets 20 fixedly connect the plates 19 and the sheet metal disc 22 to form a carrier for the friction facings 18. The carrier is mounted on the hub 1 for rotation about the clutch axis A, and rings 21 of friction facing material axially interposed between each plate 19 and the flange 24 near the central portion of the hub 1 impede such rotation.

Figure 3:
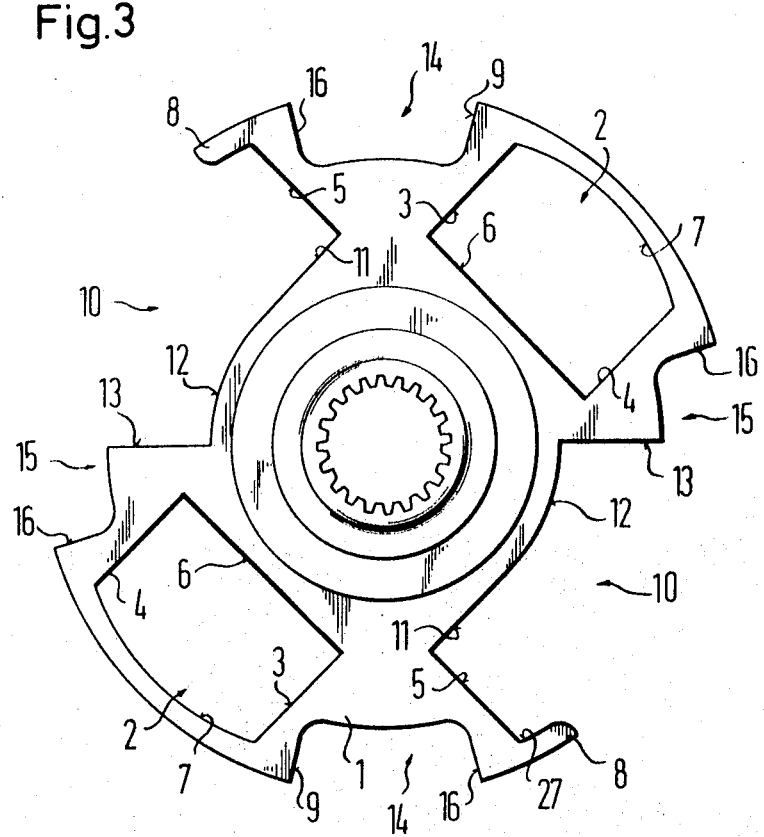
FIG. 3 shows the flanged hub of the disc in a view corresponding to that of FIG. 1.

The hub and its flange 24 are shown without other elements of the driven disc in FIG. 3. The flange has two identical, diametrically opposite openings or recesses 2 which differ from the afore-described openings 25 in the plates 19 by their slightly greater radial width. The narrow faces 6 of the flange which bound the recesses 2 in a direction toward the clutch axis are straight, parallel, and perpendicular to a common diameter through the clutch axis. Each recess is bounded in a counter-clockwise direction by a face 3 and in a clockwise direction by a face 4 of the flange, the faces 3 and 4 being perpendicular to the face 6 and symmetrical relative to the afore-mentioned diameter. The faces 3 and 4 are connected by a concavely arcuate face 7 which bounds the recess 2 in a radially outward direction and has a radius of circular curvature which is shorter than the distance from the face 7 to the clutch axis. In the rest position of the assembled disc, the two end portions of a spring 17 abut against the faces 3 and 4 respectively.

Two identical recesses 10 are formed in each part of the flange circumferentially interposed between the recesses 2. Each recess 10 is bounded in a direction toward the clutch axis by a narrow edge of the flange which has a straight portion 11 identical in shape and size with one half of each face 6, and perpendicular to the faces 6, and a portion 12 which extends in a circular arc of 45° about the clutch axis and is longer than the portion 11. An abutment face 5 of the flange perpendicular to the face portion 11 and another abutment face 13 perpendicular to the face portion 12 longitudinally bound the recess 10. The recess is open in a radially outward direction except for a hook-shaped retaining portion 8 of the flange which projects from the radially outer end of the face 5 in a circumferential direction approximately toward the abutment face 13. A concavely arcuate face 27 of the retaining portion 8 has the same radius of curvature as the face 7.

The notches 14 are offset counterclockwise from the recess 2, open in a radially outward direction, and circumferentially bounded in a clockwise direction by a narrow face 9 of the flange, and in a counterclockwise direction by a face 16. The notches 15 are circumferentially open toward the recesses 10 respectively in a clockwise direction, and are bounded counterclockwise by respective faces 16 identical with the corresponding faces of the notches 14.

When the assembled driven friction disc is in the rest position illustrated in FIG. 1 which is assumed in the absence of applied torque, the springs 17 are symmetrically distributed about the clutch axis, and two springs are held under slight compression in the openings 25 of the plates 19 and the recesses 2 of the flange 24 so that they abut under slight pressure against the faces 3, 4, 26, and thereby bias the plates 19 and the flange 24 toward the rest position, and the other two springs which are each received in an opening 25 and a recess 10 engage the abutment face 5 of the latter under light pressure.

When the associated engine (not shown) drives the non-illustrated vehicle through the clutch of which the friction disc is an element, the sheet metal disc 22 is turned clockwise. Each of the four springs 17 is compressed between trailing abutment faces 26 of the plates 19 and an abutments face 4 or 5 of the flange 24 until the spring tension balances the resistance of the wheels. All four springs 17 thus transmit torque from the friction facings 18 to the non-illustrated clutch shaft in the hub 1 and resist relative angular displacement of the hub 1 and of the carrier assembly 22, 19 with a force that increases with increasing torque.

When the engine runs at a speed lower than that corresponding to the speed of the wheels, the engine provides braking resistance to the rotation of the wheels, and torque is transmitted from the flange 24 to the plates 19. The abutment faces 3 in the recesses 2 compress two springs 17 in cooperation with the two opposite abutment faces 26 in the axially aligned openings 25. The faces 13 of the recesses 10 are so much farther from the axial centers of the springs received in the recesses 10 than the abutment faces 5 that they cannot normally exert any pressure on these springs, and the springs are inactivated during engine braking, or counterclockwise displacement of the carrier relative to the hub 1.

Figure 4:
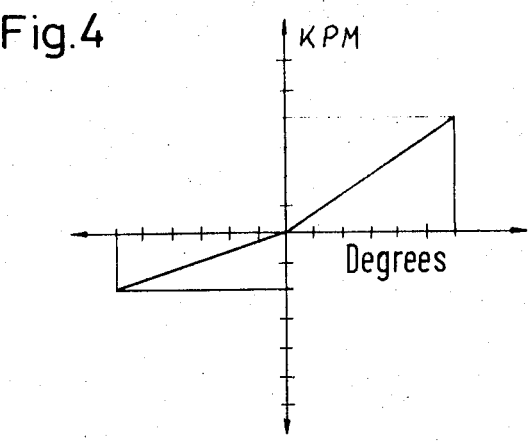
FIG. 4 diagrammatically illustrates the response of the spring arrangement in the disc of FIGS. 1 to 3 to torque applied in two opposite directions.

The characteristic of the spring arrangement as a whole is shown in FIG. 4 and reflects the mode of operation described above. It indicates the work in kilopound-meters required for turning the hub 1 and the carrier 19,22 through angles measured in degrees, the magnitudes of the work and angles being indicated in arbitrary units. During clockwise rotation of the clutch facings 18 relative to the hub 1, as viewed in FIGS. 1 and 3, the spring characteristic is represented by a substantially straight line in the upper, right-hand quadrant of the diagram whose slope relative to the abscissa is steeper than the slope of the line in the lower, left-hand quadrant which represent the lesser resistance of two springs 17 to angular clockwise displacement of the hub relative to the carrier.

The rivets 20 not only fixedly fasten the several carrier elements to each other, but they also limit the angular displacement of the hub and the carrier relative to each other by abutting against the faces 9 and 16 respectively, depending on the direction of displacement, and thereby preventing overstressing of the springs 17 in compression. As the length of each spring is reduced, it buckles slightly in a direction radially away from the clutch axis. The concavely arcuate configuration of the radially outer walls of the openings 25, the recesses 2, and of the corresponding face 27 of the retaining member 8 permit such buckling without causing undue friction between the springs 17 and the confining walls. The face 27 is sufficient to prevent spontaneous release of the spring received in each recess 10 in a radially outward direction, the retaining function of the hook-shaped flange portion 8 being assisted somewhat by the apertured plates 19.

The apparatus described and illustrated is capable of many variations. The hub 1 and flange 24 preferably constitute a unitary body, but the flanged hub may be assembled from as many individual members as may be desired and convenient under specific conditions. While two plates 19 have been shown and described, and a plate arrangement symmetrical relative to the flange 24 is preferred, a single plate 19 may cooperate with the hub flange. Four helical springs 17 arranged in such a manner that there centers are offset 90° from each other relative to the clutch axis have been found most practical in clutches intended for passenger cars of any size, but more or fewer springs may be employed, and they need not be arranged in a manner to inactivate one half of the springs during engine braking.

The abutment faces 13 in the recesses 10 are shaped to permit end portions of the springs 17 smoothly to abut against these faces, but such abutment cannot occur with springs and recesses dimensioned as shown in the drawing, and it will be understood that the term "abutment face" as employed with reference to the faces 13 does not necessarily imply an actual function of the faces 13. It is merely necessary that the face 13 be farther from the center of a spring 17 received in the associated recess 10 in the rest position of the disc than the face 5 to permit operation in the manner represented by the graph of FIG. 4.

It should be understood, therefore, that the foregoing disclosure relates only to a preferred embodiment of the invention, and that it is intended to cover all changes and modifications in the example of the invention herein chosen for the purpose of the disclosure which do not constitute departures from the spirit and scope of the invention sent fourth in the appended claims.

What is claimed is:

1. In a friction disc for a clutch including a hub, securing means for securing said hub to a clutch shaft for joint rotation about a common axis, a flange radially projecting from said hub and fixedly fastened to the same, a carrier mounted on said hub for relative angular displacement about said axis, and a plurality of damping springs interposed between said carrier and hub for resiliently resisting said angular displacement, each spring being helical about an axis approximately tangential relative to a circle about said common axis in a plane perpendicular to said common axis, said springs biasing said carrier and said hub toward an angular rest position and resiliently resisting angular displacement of said carrier and of said hub relative to each other away from said rest position, the improvement which comprises:
  a. each spring having two end portions spaced in the direction of said tangential axis thereof and a center equidistant from said end portions,
  b. a pair of first abutment faces on said carrier and a pair of second abutment faces on said flange being associated with each spring, the abutment faces of each pair being spaced approximately in the direction of said tangential axis of the associated spring from each other and from the center of said associated spring,
  c. said end portions of the spring engaging said first abutment faces respectively in said rest position, and one of the second abutment faces associated with said one spring being spaced from said one spring in said rest position,
  d. said flange being formed with a plurality of recesses respectively receiving said springs, and bounded by said pairs of second abutment faces respectively, one of said recesses receiving said one spring and being open in a direction radially outward from said common axis,
  e. another one of said recesses receiving another one of said springs, the second abutment faces bounding said other recess being substantially equidistant from the center of said other spring in said rest position,
  f. another face of said flange connecting said equidistant second abutment faces and bounding said other recess in a direction away from said common axis, said connecting face being concave in a plane perpendicular to said common axis and having a radius of curvature smaller than the spacing of said connecting face from said common axis.

2. In a disc as set forth in claim 1, a third one of said recesses being substantially identical to said one recess and receiving a third one of said springs, and a fourth recess being substantially identical with said other recess and receiving a fourth spring, said one recess and said third recess being located in said flange diametrically opposite each other relative to said common axis, and said other recess and said fourth recess being located in said flange diametrically opposite each other, said one spring, said other spring, said third spring, and said fourth spring being substantially equidistant from said common axis in said rest position.

3. In a disc as set forth in claim 2, the centers of said one, other, third, and fourth springs being offset relative to each other about 90° about said common axis in said rest position.

4. In a disc as set forth in claim 1, said flange and said carrier constituting a pair of clutch elements, one of said elements being formed with a recess circumferential about said common axis, and an abutment member secured on the other element and engaging said recess for limiting said angular movement.

5. In a disc as set forth in claim 1, friction means interposed between said carrier and said hub in permanent engagement therewith for impeding said angular movement.

6. A friction disc for a clutch comprising, in combination:
  a. a hub;
  b. securing means for securing said hub on a clutch shaft for joint rotation about a common axis;
  c. a flange member radially projecting from said hub and fixedly fastened to the same;
  d. a carrier plate member mounted on said hub for relative angular displacement about said axis,
    1. said members being each formed with a plurality of openings circumferentially spaced about said axis,
    2. each opening on said flange member being aligned with a corresponding opening on said carrier plate member in the direction of said axis and forming therewith a pair of aligned openings;
  e. a first damper spring simultaneously received in the openings of one of said pairs
    1. said spring being helical about an axis approximately tangential relative to a circle about said common axis in a plane transverse to said common axis,
    2. spring having two end portions spaced in the direction of said tangential axis thereof,
    3. one of said members having two abutment faces spaced in each aperture thereof in the direction of said tangential axis, and the other member having one abutment face in each of the apertures of said other member,
    4. one of said end portions engaging one of said two abutment faces and the other end portion engaging said one abutment face of the other member in all operative positions of said members,
    5. said spring being received in the aperture of said one member under sufficient compressive stress to bias said members toward a rest position and resiliently to resist angular displacement of said members relative to each other away from said rest position,
    6. said one end portion being spaced from said other member in the aperture of said one pair in said other member sufficiently to permit free movement of said one end portion away from the other end portion in said last-mentioned aperture in the direction of said tangential axis in said rest position;
  f. a friction facing secured to said carrier plate member; and
  g. a second damper spring simultaneously received in the opening of another one of said pairs.
    1. said other spring being helical about an axis approximately tangential relative to a circle about said common axis in a plane transverse to said common axis and having two end portions spaced in the direction of said tangential axis thereof, 2. each of said members having two abutment faces spaced in the respective apertures of said other pair, 3. the two end portions of said second spring engaging respective abutment faces of said two members in said rest position.

7. A disc as set forth in claim 6, wherein each of said apertures receives not more than one of said springs.

8. A disc as set forth in claim 7, wherein said one member is said carrier plate member, and the spacing of said one end portion from said other member in the aperture of said one pair in said other member is sufficient to permit said free movement of said one end portion in all of said operative positions.

9. In a disc as set forth in claim 1, only one spring being associated with each pair of first abutment faces and each pair of second abutment faces.

10. In a friction disc for a clutch including a hub, securing means for securing said hub to a clutch shaft for joint rotation about a common axis, a flange radially projecting from said hub and fixedly fastened to the same, a carrier mounted on said hub for relative angular displacement about said axis, and a plurality of damping springs interposed between said carrier and hub for resiliently resisting said angular displacement, each spring being helical about an axis approximately tangential relative to a circle about said common axis in a plane perpendicular to said common axis, said springs biasing said carrier and said hub toward an angular rest position and resiliently resisting angular displacement of said carrier and of said hub relative to each other away from said rest position, the improvement which comprises:

a. each spring having two end portions spaced in the direction of said tangential axis thereof and a center equidistant from said end portions, b. a pair of first abutment faces on said carrier and a pair of second abutment faces on said flange being associated with each spring, the abutment faces of each pair being spaced approximately in the direction of said tangential axis of the associated spring from each other and from the center of said associated spring, c. said end portions of the spring engaging said first abutment faces respectively in said rest position, and one of the second abutment faces associated with said one spring being spaced from said one spring in said rest position, d. said flange being formed with a plurality of recesses respectively receiving said springs, and bounded by said pairs of second abutment faces respectively, one of said recesses receiving said one spring and being open in a direction radially outward from said common axis, e. retaining means for preventing spontaneous release of said spring from said one recess in said radially outward direction, said retaining means including a retaining member projecting from one of the second abutment faces toward the other second abutment face substantially in the direction of said axis of said one spring, said retaining member having a concavely arcuate face bounding said one recess, the radius of curvature of said arcuate face being smaller than the spacing thereof from said common axis, f. said flange having another face bounding said one recess in a direction toward said common axis, a first portion of said other face being substantially straight in a radial plane through said common axis, and a second portion of said other face being concavely arcuate in said radial plane, the arc of said second portion being circular about said common axis.

* * * * *